United States Patent [19]

Kellar et al.

[11] Patent Number: 4,593,316

[45] Date of Patent: Jun. 3, 1986

[54] IMAGE PROCESSING SYSTEM

[75] Inventors: Paul R. N. Kellar, Newbury; Robert J. Long, Didcot, both of England

[73] Assignee: Micro Consultants Limited, Surrey, England

[21] Appl. No.: 597,981

[22] Filed: Apr. 9, 1984

[30] Foreign Application Priority Data

Apr. 15, 1983 [GB] United Kingdom ............... 8310239

[51] Int. Cl.[4] .................. H04N 5/217; H04N 7/01
[52] U.S. Cl. ................... 358/140; 358/166; 358/167
[58] Field of Search .............. 358/140, 166, 167, 112

[56] References Cited

U.S. PATENT DOCUMENTS

| 4,275,595 | 6/1981 | Hassler ............... 358/112 |
| 4,394,684 | 7/1983 | Verhoeven ........... 358/166 |
| 4,408,228 | 10/1983 | Mahony ............. 358/140 |

Primary Examiner—Howard W. Britton
Attorney, Agent, or Firm—Dowell & Dowell

[57] ABSTRACT

A system for processing images typically still images from a slow scan source such as associated with an electron microscope. The analogue source is converted into digital form via an ADC and passes via an adder to a framestore. An output of the framestore is also received by the adder. The capacity of the framestore is sufficiently large to accommodate several hundred summed frames. The image is built up by using all the stored information and all the incoming information. A divider under the control of a frame counter automatically corrects for intensity as the summation of frames progresses, the result being available for monitoring via a digital to analogue converter. Additional mechanisms are disclosed for dealing with other aspects associated with differing frame rates.

10 Claims, 7 Drawing Figures

```
      -10  -10  -10
      -10  +90  -10
      -10  -10  -10
```

IMAGE PROCESSING SYSTEM

BACKGROUND TO THE INVENTION

The invention relates to an image processing system for still images.

When dealing with still images from a relatively noisy source (e.g., scanning electron microscope) there is a requirement to reduce such noise efficiently to provide a usable image. It is also desirable to filter the image to enhance a characteristic of the image, such as edges therein.

It has been the practice in the past to employ slow scan techniques with a long persistence screen to generate a usable image with reduced visible noise.

This technique has the disadvantage of producing a bright image at the appropriate scanning line, whilst the earlier lines are less bright and fade in dependence on the degree of persistence. An alternative solution has required the production of photographs by a camera in contact with the screen. Whilst this gives better results the speed and flexibility of such a system is restricted.

The Applicants have recently become aware of UK Patent Specification No. 2122050A in the name of N. V. Philips, Gloeilampenfabriken and published Jan. 4, 1984.

OBJECT OF THE INVENTION

The present invention is concerned with providing an improved solution to this problem.

SUMMARY OF THE INVENTION

According to the present invention there is provided, a video signal processing system comprising
storage means for video signals representing an image;
input means for repeatedly writing video signals in said storage means at input line and frame rates, video signals relating to the same point of successive image frames being superimposed in said storage means;
output means for repeatedly reading video signals from said storage means at output line and frame rates differing from said input rates, said output means being arranged to operate contemporaneously with said input means so that the image can be reproduced in response to the image signals from said output means, whilst writing is taking place; and
means for producing attenuation of said superimposed video signals as a function of the number of frames superimposed by said input means.

According to another apsect of the present invention, there is provided a video signal processing system comprising
storage means for video signals representing an image, input means for repeatedly writing video signals in said storage means at input line and frame rates, video signals relating to the same point of successive image frames being superimposed in said storage means;
output means for repeatedly reading video signals from said storage means at output line and frame rates differing from said input rates, said output means being arranged to operate contemporaneously with said input means so that the image can be reproduced in response to the image signals from said output means, whilst writing is taking place; and
compensating means for substantially avoiding a change in the brightness of such a reproduced image when the lines being read by said output means cross over the lines being written by said input means.

According to another advantageous feature of the present invention, there is provided a video signal processing system comprising
storage means for storing signals relating to an image, said storage means being in two parts each having the capacity to store video signals representing a complete scan of said image;
means for writing video signals relating to one scan of said image in one of said parts;
means for reading video signals from said one part and for modifying said signals;
means for writing said modified video signals in the second part of said storage means, said modified signals being superimposed on previously modified signals in said second part;
switch means for selectively reading video signals from one or other of said parts for comparative reproduction of the images represented by video signals stored in said two parts.

This feature of the invention allows images to be modified by filtering, for example, convolution filtering, in a versatile and quick manner.

BRIEF DESCRIPTION OF THE DRAWINGS

The invention will now be described by way of example with reference to the accompanying drawings in which.

DESCRIPTION OF PREFERRED EMBODIMENTS

Figure 1:
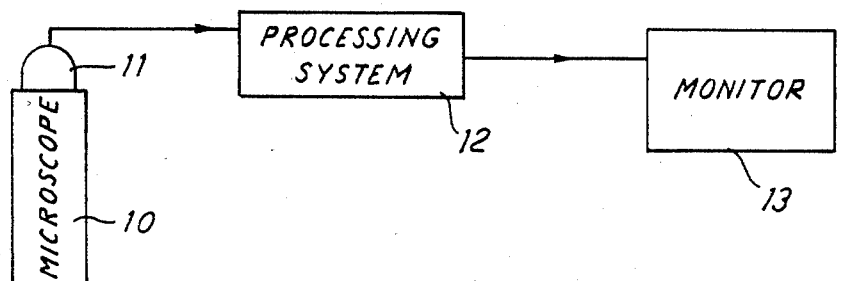
FIG. 1 shows an arrangement including an electron microscope.

FIG. 1 shows the overall arrangement for use with a scanning electron microscope in this example.

The image from the microscope 10 is received by a scanning device 11 and the output therefrom passes to a processing system 12 which is configured to reduce the noise prior to receipt by monitor 13.

Figure 2:
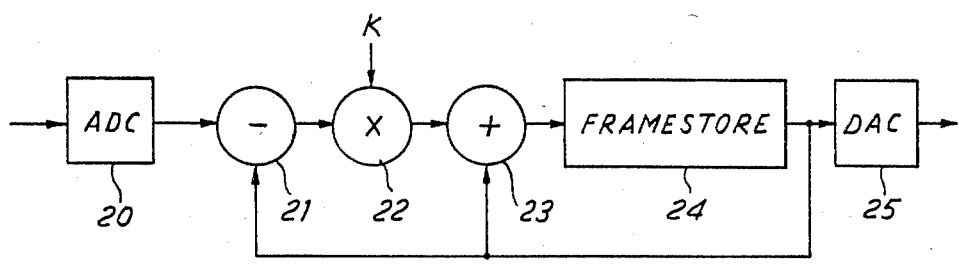
FIG. 2 shows one approach to fabricating the processing system for improving the signal to noise ratio.

One possible arrangement which could be considered for the processing system 12 is shown in FIG. 2. This arrangement is similar to noise reduction systems employed in broadcast television and includes an analogue to digital converter (ADC) 20, a subtractor 21, a multiplier 22 and an adder 23. A framestore 24 is provided as well as a digital to analogue converter (DAC) 25. With a t.v. rate scanner 11 providing the analogue input to ADC 20, the incoming digital information is received for arithmetic processing by blocks 21, 22 and 23. Information previously stored in framestore 24 is also available for use by the subtractor 21 and adder 23. Stored data from framestore 24 is also available for display on the monitor via DAC 25. The processing operates so that a portion of the incoming data is added to a portion of the previously stored data, the proportions being determined by the value K, which may vary in dependence on picture movement content. Whilst such an arrangement is ideal for moving pictures and could be used when say focusing the microscope or moving the specimen therein, the processing employed is not ideal for stationary pictures which would be the type of image normally observed from the microscope. Because of the exponential nature of the picture build up processing, there is always a contribution made from only part of the incoming information and part of the stored information so the signal to noise ratio is not sufficient for some applications, and the full potential for picture improvement is not achieved.

Figure 3:
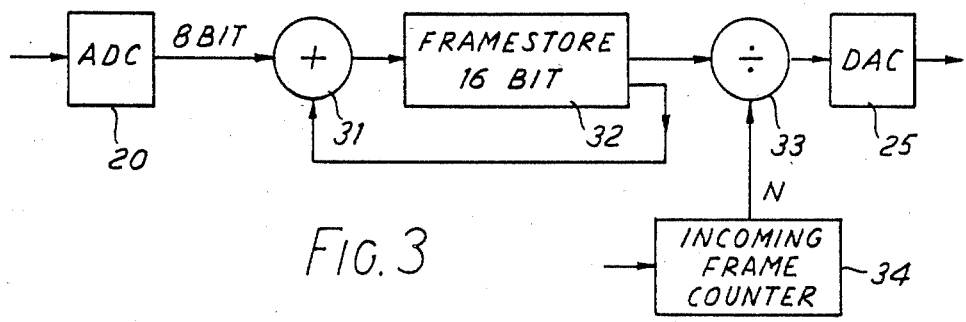
FIG. 3 shows an improved arrangement to that of FIG. 2.

In the improved FIG. 3 arrangement now described, the system is designed to allow the image to be built up by using *all* the *stored* information and *all* the *incoming* information. This arrangement includes ADC 20, adder 31, framestore 32, divider 33 and DAC 25. The control of the divider is provided by frame counter block 34.

The analogue input, converted typically into 8 bit word form by ADC 20, is received by adder 31 and the whole of this incoming information is added to the whole of the information at each particular corresponding point in the digital framestore 32. The store size is typically 512×512 pixel with 16 bit capacity. This allows summation of up to 256 frames to be made without store overload. As there is no picture movement there will be no picture smearing due to spatial differences in successive pictures, and the system gives a more improved signal to noise ratio over a given period than heretofor. Typically the framestore will be provided with a 3 port arrangement so that input and feedback can use two ports and the output for monitoring can make use of the third port.

In order to reduce the output intensity to a normal level the divider 33 is provided prior to the DAC 25. The output from DAC 25 can be used for monitor 13 of FIG. 1.

Whilst it would be possible to divide the output by a fixed amount over successive frames using block 33, this would produce a visual result which appears as a faint picture becoming brighter and brighter over successive frames as the summation at the input proceeds. This we have found to be inefficient as the operator has to wait up to several minutes or longer depending on the incoming scan rate before he can determine whether the imaged specimen is correctly placed for example. By providing the counter arrangement 34 co-operating with divider 33 we have produced a mechanism which automatically adjusts the framestore output frame by frame so that the correct intensity output will automatically be available for monitoring from the first frame onwards. Thus the start of frame pulse will increment the counter, frame by frame, to the maximum desired (for example 256 frames). Thereafter the framestore can be inhibited to prevent further information being entered. No further incrementing of the counter 34 will then be allowed.

To the operator this technique results in a visible picture from receipt of the first complete incoming frame scan, although the noise quality is initially unchanged. As N=1 then no attenuation of the picture intensity occurs. As the successive frames are summed, the signal:noise ratio of the monitored picture rapidly improves and the discernable features within the picture become more distinct, as all the stored information is added to all the incoming information. The intensity of the image will remain constant throughout because the divider is adjusted automatically at the start of a new incoming frame. The operator is rapidly in a position to see if the image displayed is as he wishes so that a different view or magnification for example can be chosen and the sequence repeated once more. Thus the operator can decide in a few seconds what he wants or does not want without a great deal of time wasting.

Where the system is used with a slow scanning input relative to the t.v. output raster, it is preferably to employ a mechanism which allows operation to be achieved without visible intensity variations due to the asynchronous nature of the output scanning relative to the slower input scanning. Without correction this will appear as a brighter portion of the output frame in that part associated with the current input frame scan.

Figure 4:
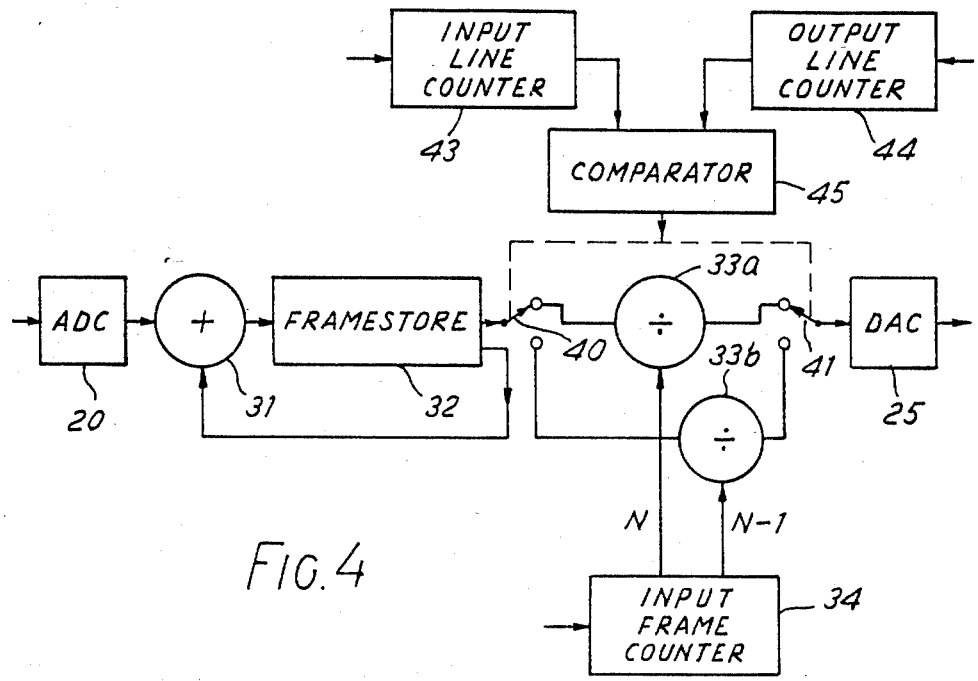
FIG. 4 shows an expanded arrangement for coping with dissimilar scan rates.

One arrangement capable of compensating for this problem is shown in FIG. 4.

The input as before passes to the store 32 via ADC 20 and adder 31. The output to be monitored however can now pass via switch 40 to either divider 33a or 33b and thence via switch 41 the DAC 25.

The frame counter 34 provides two outputs corresponding to incoming frames N and N−1. The input line counter 43 receives line pulses at the incoming scan rate and the output line counter 44 receives line pulses at the outgoing scan rate. These counter outputs are received by comparator 45 which actuates a change in position of the ganged switches 40 and 41, whenever it establishes that the two counters are equal. Thus assuming a slow input scanning rate, the Nth frame scanning from the top of the screen will effectively be brighter when the framestore output is monitored (if uncorrected) than the remaining portion of the frame which will correspond to the N−1 frame. By switching in the division to equal N−1 at the crossover point the intensity will automatically be compensated so that the viewer will not be aware of any visual difference.

Figure 5:
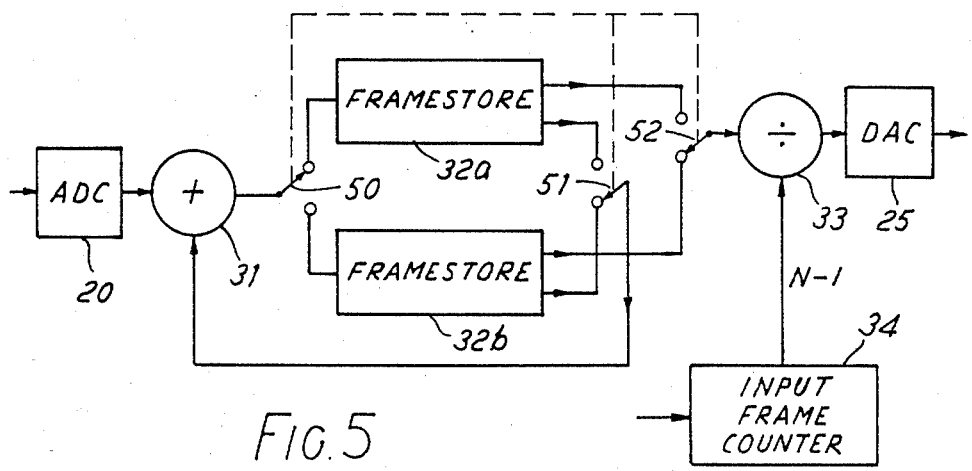
FIG. 5 shows an alternative arrangement to that of FIG. 4.
Figures 6, 7:
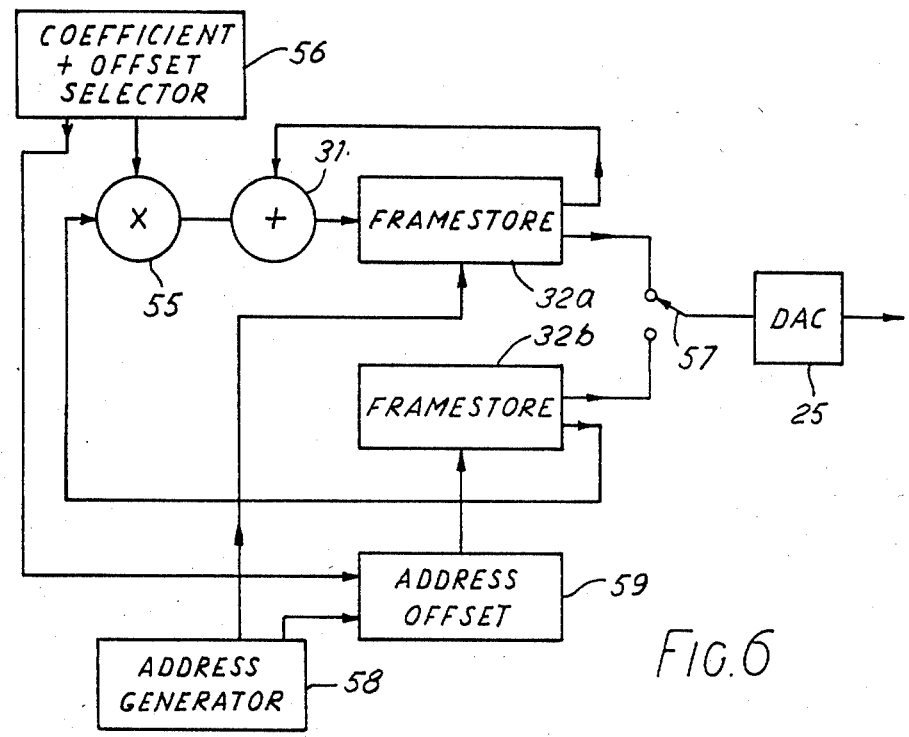
FIG. 6 shows a system based on FIG. 5 with additional manipulation capabilities.
FIG. 7 shows one example of edge sharpening techniques using the FIG. 6 configuration.

An alternative approach shown in FIG. 5 is to employ two framestores 32a and 32b with associated switches 50-52. Each store has typically a capacity of 512×512 pixel×16 bit. In this arrangement the first incoming frame is passed to framestore 32b (say) and the second incoming frame to store 32a and so on with the ganged switches operating at incoming frame rate. Thus as illustrated, the second incoming frame (say) is added to the first frame and passes via switch 50 to store 32a. Whilst this is occuring the output from store 32b is monitored via switch 52 and divider 33 and DAC 25. The divider value of 1 ensures that no attenuation occurs at the output (N being the number of the current incoming frame). After receipt of the second incoming frame the switches change position and the third frame passes to store 32b having added to it the two earlier frames summed within store 32a. The content of store 32a is also during this time monitored (with a value of 2 for the divider 33). Thus the requirement for two separate dividers is obviated. The provision of the two framestores allows additional manipulation to be achieved without requiring a large number of additional components as now illustrated by way of example in FIG. 6. The switching arrangements of FIG. 5 and some of the other system blocks are omitted to avoid confusion. The output of store 32b can be passed to multiplier 55 which modifies each pixel by a weighting factor, typically fixed for the duration of a frame, and adds this into an initially zeroed store 32a by means of adder 31. At the same time the pixel addressing of store 32a may be arranged, by means of the pixel address generator 58 which controls the scanning of the stores, and the address offset selector 59, to be displaced by one or more pixel positions horizontally and/or vertically from the addressing of store 32b. These offsets are typically specified for the duration of each of a number of successive frames in parallel with the multiplying coefficient. Thus the image in 32a becomes a modified version of that in 32b, the modification being the addition of weighted values of nearby pixels to each pixel in the original. The coefficients and offsets can for example be chosen to improve edge sharpness. FIG. 7 shows a typical combination of weighting functions and address offsets for the modification of each pixel by a 3×3 matrix of its nearest neighbours. Such an arrangement is relatively fast in operation. A 3×3 matrix will take 9 frames to process. This is much faster (typically 50 times) than would be achieved using software processing techniques.

The multiplier 55 could be part of an arithmetic processor so that a very versatile arrangement is provided.

An alternative arrangement to FIG. 6 is to replace multiplier 55 by a binary shifter, controlled from a list of shift amounts, and achieve multiplication by additional shifts and frame iterations to achieve the same result more slowly but at lower cost.

Although the framestore 32b has been described as holding data previously processed using the FIG. 5 arrangement, the framestore could contain data in unprocessed form or processed by other techniques if desired.

Although the system has been described in relation to electron microscopy, it could be used with other sources of still images.

Although the system in the various embodiments has been described in terms of intensities, it would be possible to expand the system by triplication for example to assign colours to the image and control these in similar manner.

The provision of peripheral devices such as a disc store will allow manipulated images to be retained for further use.

We claim:

1. A video signal processing system comprising:
   storage means for video signals representing an image;
   input means for repeatedly writing video signals in said storage means at input line and frame rates, video signals relating to the same point of successive image frames being superimposed in said storage means;
   output means for repeatedly reading video signals from said storage means at output line and frame rates differing from said input rate, said output means being arranged to operate contemporaneously with said input means so that the image can be reproduced in response to the image signals from said output means, whilst writing is taking place; and
   means for producing attenuation of said superimposed video signals as a function of the number of frames superimposed by said input means.

2. A system according to claim 1, in which said attenuating means is arranged to attenuate said superimposed video signals by a factor proportional to the number of superimposed frames.

3. A system according to claim 1 in which said attenuating includes means for counting the number of frame of said input means, means for comparing the line count of said input means with the line count of said output means and means for dividing said superimposed video signals selectively by a factor equal to said frame count, or one less than said frame count, depending on the relationship of said compared line counts.

4. A system according to claim 1 in which said storage means is divided into two parts having switch means for causing said input means to write incoming video signals alternately into said parts with the addition of the video signals already stored at corresponding locations in the other part, and having further switch means for causing said output means to read video signals from the other part, said attenuating means being arranged to attenuate said last mentioned signals by the number of frame superimposed in the other part.

5. A system according to claim 1 in which said input means is arranged to write video signals at a line and frame rate compatible with a slow scan pick up device, and said output means is arranged to read said video signals from said storage means at a faster line and frame rate compatible with a television image reproducing device.

6. A video signal processing system comprising
   storage means for video signals representing an image, input means for repeatedly writing video signals in said storage means at input line and frame rates, video signals relating to the same point of successive image frames being superimposed in said storage means;
   output means for repeatedly reading video signals from said storage means at output line and frame rates differing from said input rates, said output means being arranged to operate contemporaneously with said input means so that the image can be reproduced in response to the image signals from said output means, whilst writing is taking place; and
   compensating means for substantially avoiding a change in the brightness of such a reproduced image when the lines being read by said output means cross over the lines being written by said input means.

7. A system according to claim 6 in which said input means is arranged to write video signals at a line and frame rate compatible with a slow scan pick up device, and said output means is arranged to read said video signals from said storage means at a faster line and frame rate compatible with a television image reproducing device.

8. A video signal processing system comprising
   storage means for storing signals relating to an image, said storage means being two parts each having the capacity to store video signals representing a complete scan of said image;
   means for writing video signals relating to one scan of said image in one of said parts;
   means for reading video signals from said one part and for modifying said signals;
   means for writing said modified video signals in the second part of said storage means, said modified signals being superimposed on previously modified signals in said second part; and
   switch means for selectively reading video signals from one or other of said parts for comparative reproduction of the images represented by video signals stored in said two parts.

9. A system according to claim 8, in which said means for modifying comprises means for offsetting the address for video signals in one store part compared with that in the other.

10. A system according to claim 8, in which said means for modifying comprises means for multiplying video signals by a variable coefficient.

* * * * *